UNITED STATES PATENT OFFICE.

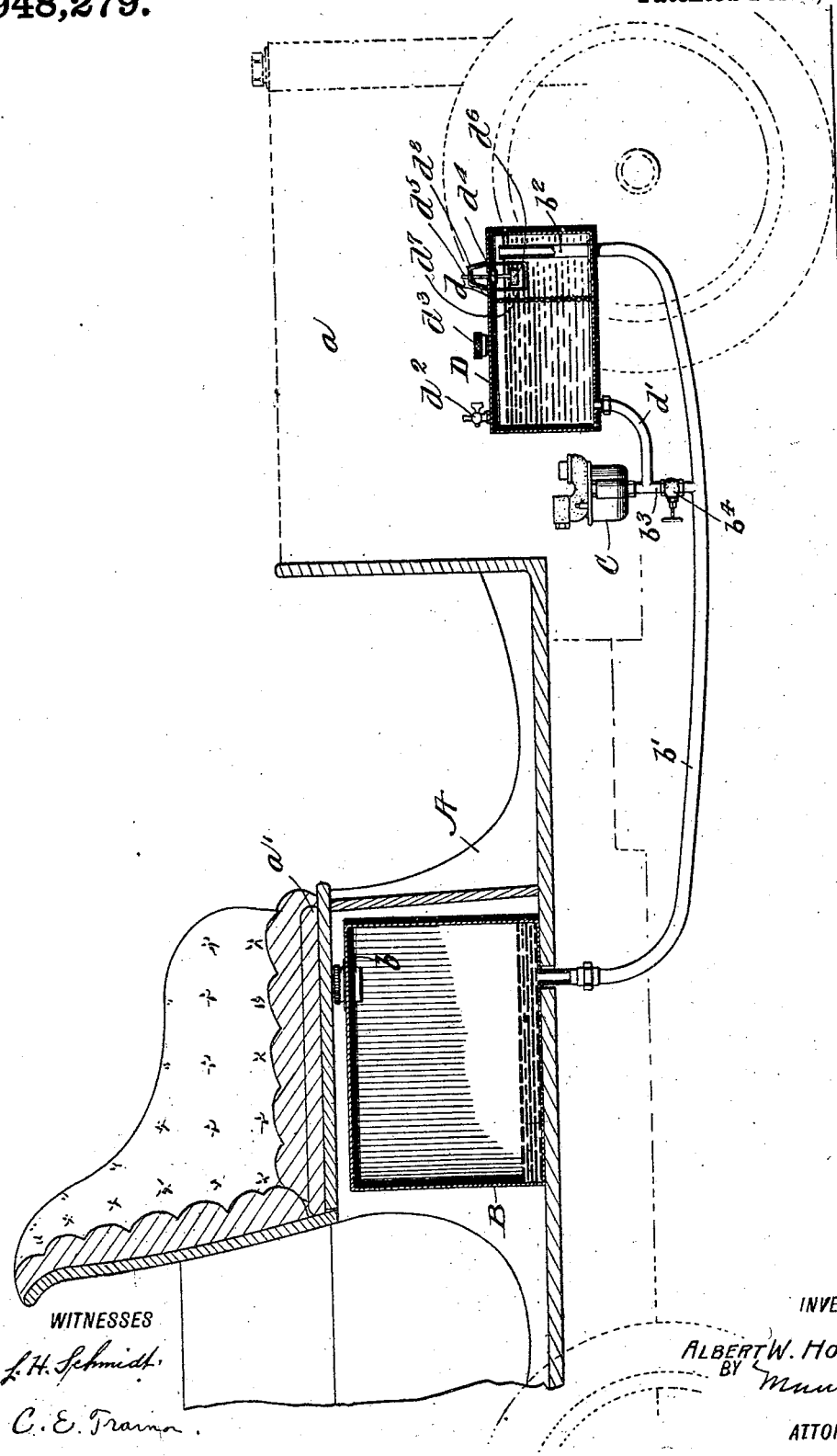

ALBERT WARREN HOFACKER, OF BOTTINEAU, NORTH DAKOTA.

GASOLENE-FEED.

948,279.   Specification of Letters Patent.   Patented Feb. 1, 1910.

Application filed February 24, 1909. Serial No. 479,682.

*To all whom it may concern:*

Be it known that I, ALBERT WARREN HOFACKER, a citizen of the United States, residing at Bottineau, in the county of Bottineau and State of North Dakota, have invented a new and useful Improvement in Gasolene-Feeds, of which the following is a specification.

My invention is an improvement in gasolene feeds and consists in certain novel constructions and combinations of parts hereinafter described and claimed.

The object of the invention is to provide a means for insuring a constant supply of liquid fuel to the carbureter of a power driven vehicle, regardless of the inclination of the body of the same, as for instance when hill climbing.

In vehicles having the engine in front, and the fuel tank beneath the seat, or behind the engine, the carbureter will not get a sufficient supply of fuel when the front of the vehicle is elevated, as in hill climbing, especially if the supply of fuel is low.

Referring to the drawings forming a part hereof, the figure is a longitudinal section of a portion of a vehicle provided with the improvement.

The vehicle A, is provided with an engine (not shown) arranged beneath the hood $a$, and the fuel tank B, is arranged beneath the seat $a'$. The tank is provided with the usual filling opening normally closed by a cap $b$, and a pipe $b'$, leads from the tank to the front of the vehicle. An auxiliary tank D is arranged in front of the carbureter, and at about the center of the engine hood as shown, and the pipe $b'$ extends into and nearly to the top of the auxiliary tank as at $b^2$, and near the front end thereof. The tank D is provided with a gauze partition $d$, and a second pipe $d'$ leads from the rear end of the auxiliary tank to the carbureter, and the partition is arranged between the two pipes. A branch pipe $b^3$ leads from the pipe $b'$ between the two tanks to the carbureter, and a valve $b^4$ is interposed in the branch. It will be evident that by closing the valve, the fuel may be constrained to pass to the carbureter through the pipe $b'$ the tank D and the pipe $d'$, while by opening the valve, it may pass directly from the tank B to the carbureter. It will be observed that the opening $b^2$ of the pipe $b'$ in the tank D, is somewhat above the level of the bottom of the tank B, so that when the tank B is empty the tank D will be yet almost full of fuel.

The tank D is provided with a pet-cock $d^2$, and with an opening closed by a screw cap $d^3$. An air escape valve is also provided, comprising an aperture in the tank wall, which is adapted to be closed by a ball valve $d^4$ on a stem $d^5$ passing through the aperture, and a float $d^6$ is on the lower end of the stem. A cage $d^7$ is provided for guiding the float and a hood $d^8$ projects from the tank for inclosing the stem.

The above described arrangement permits the fuel to flow readily into the tank D until it is practically full, when the valve closes, thus preventing an overflow of the auxiliary tank.

I claim—

1. In a device of the class described, a carbureter, a fuel tank, an auxiliary fuel tank upon the opposite side of the carbureter from the main fuel tank and near the carbureter, the top of the auxiliary tank being at approximately the level of the bottom of the main tank, a pipe leading from the bottom of the main tank and discharging near the top of the auxiliary tank, a pipe leading from the auxiliary tank to the carbureter, a strainer within the auxiliary tank between the openings of said pipes, a branch leading from the first named pipe to the carbureter, and a valve in the branch pipe.

2. In a device of the class described, a carbureter, a fuel tank, an auxiliary fuel tank upon the opposite side of the carbureter from the main fuel tank and near the carbureter, the top of the auxiliary tank being at approximately the level of the bottom of the main tank, a pipe leading from the bottom of the main tank and discharging near the top of the auxiliary tank, a pipe leading from the auxiliary tank to the carbureter, a strainer within the auxiliary tank between the openings of said pipes, a branch leading from the first named pipe to the carbureter.

3. In a device of the class described, a carbureter, a fuel tank, an auxiliary fuel tank upon the opposite side of the carbureter from the main fuel tank and near the carbureter, the top of the auxiliary tank being at approximately the level of the bottom of the main tank, a pipe leading from the bottom of the main tank and discharging near the top of the auxiliary tank, a pipe leading from the auxiliary tank to the carbureter, and a branch pipe leading from the first named pipe to the carbureter.

4. In a device of the class described, a carbureter, a fuel tank behind the carbureter, an auxiliary fuel tank in front of the carbureter and at a lower level than the main tank, a pipe leading from the bottom of the main tank and discharging near the top of the auxiliary tank, a pipe leading from the auxiliary tank to the carbureter, and a valved branch pipe leading from the first named pipe to the carbureter.

5. The combination with a motor driven vehicle, of a carbureter, a fuel tank arranged behind the motor, an auxiliary fuel tank in front of the motor and at a lower level than the main tank, a valved connection between the main tank and the carbureter, and a connection between the main tank and the carbureter through the auxiliary tank.

ALBERT WARREN HOFACKER.

Witnesses:
HENRY S. BLOOD,
J. C. ADAMSON.